(12) United States Patent
Gallivan et al.

(10) Patent No.: US 7,313,556 B2
(45) Date of Patent: Dec. 25, 2007

(54) SYSTEM AND METHOD FOR DYNAMICALLY EVALUATING LATENT CONCEPTS IN UNSTRUCTURED DOCUMENTS

(75) Inventors: Dan Gallivan, Bainbridge Island, WA (US); Kenji Kawai, Seattle, WA (US)

(73) Assignee: Attenex Corporation, Seattle, WA (US)

( * ) Notice: Subject to any disclaimer, the term of this patent is extended or adjusted under 35 U.S.C. 154(b) by 0 days.

(21) Appl. No.: 11/304,406

(22) Filed: Dec. 14, 2005

(65) Prior Publication Data
US 2006/0089947 A1    Apr. 27, 2006

Related U.S. Application Data

(63) Continuation of application No. 09/944,474, filed on Aug. 31, 2001, now Pat. No. 6,978,274.

(51) Int. Cl.
G06F 7/00   (2006.01)
G06F 15/00  (2006.01)

(52) U.S. Cl. .......................... 707/6; 707/2; 707/104.1; 704/9; 704/10; 715/530; 715/531; 706/45

(58) Field of Classification Search ................ 707/102, 707/6, 100, 101, 104.1; 715/530, 531; 704/9, 704/10; 706/45
See application file for complete search history.

(56) References Cited

U.S. PATENT DOCUMENTS

| | | | | |
|---|---|---|---|---|
| 5,940,821 A * | 8/1999 | Wical | ............................. | 707/3 |
| 5,987,446 A * | 11/1999 | Corey et al. | ..................... | 707/3 |
| 6,415,283 B1 * | 7/2002 | Conklin | .......................... | 707/3 |
| 6,460,034 B1 * | 10/2002 | Wical | ............................. | 707/5 |
| 6,510,406 B1 * | 1/2003 | Marchisio | ....................... | 707/3 |
| 6,629,097 B1 * | 9/2003 | Keith | .............................. | 707/5 |
| 6,701,305 B1 * | 3/2004 | Holt et al. | ..................... | 706/45 |
| 6,778,995 B1 * | 8/2004 | Gallivan | ...................... | 707/102 |
| 6,816,175 B1 * | 11/2004 | Hamp et al. | ................. | 715/854 |
| 6,862,710 B1 * | 3/2005 | Marchisio | .................... | 715/513 |
| 6,978,274 B1 * | 12/2005 | Gallivan et al. | ............. | 707/102 |
| 7,051,017 B2 * | 5/2006 | Marchisio | ....................... | 707/3 |
| 2003/0217047 A1 * | 11/2003 | Marchisio | ....................... | 707/3 |
| 2005/0010555 A1 * | 1/2005 | Gallivan | ........................ | 707/2 |

OTHER PUBLICATIONS

D. Sullivan, "Document Warehousing and Text Mining: Techniques for Improving Business Operations, Marketing and Sales," Ch. 1-3, John Wiley & Sons, New York, NY (2001).

* cited by examiner

*Primary Examiner*—John Breene
*Assistant Examiner*—Anh Ly
(74) *Attorney, Agent, or Firm*—Patrick J. S. Inouye; Krista A. Wittman

(57) ABSTRACT

A system and method for dynamically evaluating latent concepts in unstructured documents is disclosed. A multiplicity of concepts are extracted from a set of unstructured documents into a lexicon. The lexicon uniquely identifies each concept and a frequency of occurrence. A frequency of occurrence representation is created for the documents set. The frequency representation provides an ordered corpus of the frequencies of occurrence of each concept. A subset of concepts is selected from the frequency of occurrence representation filtered against a pre-defined threshold. A group of weighted clusters of concepts selected from the concepts subset is generated. A matrix of best fit approximations is determined for each document weighted against each group of weighted clusters of concepts.

26 Claims, 11 Drawing Sheets

70

100

110

120

130

170

|  | | Cluster₁ | Cluster₂ | Cluster₃ | Cluster₄ | |
|---|---|---|---|---|---|---|
| 172 | Document₁ | 10 | 5 | 0 | 1 | ← 173a |
| | Document₂ | 8 | 4 | 0 | 0 | ← 173b |
| | Document₃ | 0 | 0 | 12 | 2 | ← 173c |
| | . | | | | | |
| | . | | | | | |
| | . | | | | | |
| | Documentₙ | 0 | 0 | 17 | 3 | ← 173d |

171 spans Cluster₁ through Cluster₄

SYSTEM AND METHOD FOR DYNAMICALLY EVALUATING LATENT CONCEPTS IN UNSTRUCTURED DOCUMENTS

CROSS-REFERENCE TO RELATED APPLICATIONS

This patent application is a continuation of U.S. Ser. No. 09/944,474 filed Aug. 31, 2001 U.S. Pat. No. 6,978,274, issued Dec. 20, 2005 the priority date of which is claimed and the disclosure of which is incorporated by reference.

FIELD OF THE INVENTION

The present invention relates in general to text mining and, in particular, to a system and method for dynamically evaluating latent concepts in unstructured documents.

BACKGROUND OF THE INVENTION

Document warehousing extends data warehousing to content mining and retrieval. Document warehousing attempts to extract semantic information from collections of unstructured documents to provide conceptual information with a high degree of precision and recall. Documents in a document warehouse share several properties. First, the documents lack a common structure or shared type. Second, semantically-related documents are integrated through text mining. Third, essential document features are extracted and explicitly stored as part of the document warehouse. Finally, documents are often retrieved from multiple and disparate sources, such as over the Internet or as electronic messages.

Document warehouses are built in stages to deal with a wide range of information sources. First, document sources are identified and documents are retrieved into a repository. For example, the document sources could be electronic messaging folders or Web content retrieved over the Internet. Once retrieved, the documents are pre-processed to format and regularize the information into a consistent manner. Next, during text analysis, text mining is performed to extract semantic content, including identifying dominant themes, extracting key features and summarizing the content. Finally, metadata is compiled from the semantic context to explicate essential attributes. Preferably, the metadata is provided in a format amenable to normalized queries, such as database management tools. Document warehousing is described in D. Sullivan, "Document Warehousing and Text Mining, Techniques for Improving Business Operations, Marketing, and Sales," Chs. 1-3, Wiley Computer Publishing (2001), the disclosure of which is incorporated by reference.

Text mining is at the core of the data warehousing process. Text mining involves the compiling, organizing and analyzing of document collections to support the delivery of targeted types of information and to discover relationships between relevant facts. However, identifying relevant content can be difficult. First, extracting relevant content requires a high degree of precision and recall. Precision is the measure of how well the documents returned in response to a query actually address the query criteria. Recall is the measure of what should have been returned by the query. Typically, the broader and less structured the documents, the lower the degree of precision and recall. Second, analyzing an unstructured document collection without the benefit of a priori knowledge in the form of keywords and indices can present a potentially intractable problem space. Finally, synonymy and polysemy can cloud and confuse extracted content. Synonymy refers to multiple words having the same meaning and polysemy refers to a single word with multiple meanings. Fine-grained text mining must reconcile synonymy and polysemy to yield meaningful results.

In the prior art, text mining is performed in two ways. First, syntactic searching provides a brute force approach to analyzing and extracting content based on literal textual attributes found in each document. Syntactic searching includes keyword and proximate keyword searching as well as rule-based searching through Boolean relationships. Syntactic searching relies on predefined indices of keywords and stop words to locate relevant information. However, there are several ways to express any given concept. Accordingly, syntactic searching can fail to yield satisfactory results due to incomplete indices and poorly structured search criteria.

A more advanced prior art approach uses a vector space model to search for underlying meanings in a document collection. The vector space model employs a geometric representation of documents using word vectors. Individual keywords are mapped into vectors in multi-dimensional space along axes representative of query search terms. Significant terms are assigned a relative weight and semantic content is extracted based on threshold filters. Although substantially overcoming the shortcomings of syntactic searching, the multivariant and multidimensional nature of the vector space model can lead to a computationally intractable problem space. As well, the vector space model fails to resolve the problems of synonymy and polysemy.

Therefore, there is a need for an approach to dynamically evaluating concepts inherent in a collection of documents. Such an approach would preferably dynamically discover the latent meanings without the use of a priori knowledge or indices. Rather, the approach would discover semantic relationships between individual terms given the presence of another item.

There is a further need for an approach to providing a graphical visualization of concepts extracted from a document set through semantic indexing. Preferably, such an approach would extract the underlying meanings of documents through statistics and linear algebraic techniques to find clusters of terms and phrases representative of the concepts.

SUMMARY OF THE INVENTION

The present invention provides a system and method for indexing and evaluating unstructured documents through analysis of dynamically extracted concepts. A set of unstructured documents is identified and retrieved into a document warehouse repository. Individual concepts are extracted from the documents and mapped as normalized data into a database. The frequencies of occurrence of each concept within each document and over all documents are determined and mapped. A corpus graph is generated to display a minimized set of concepts whereby each concept references at least two documents and no document in the corpus is unreferenced. A subset of documents occurring within predefined edge conditions of a median value are selected. Clusters of concepts are grouped into themes. Inner products of document concept frequency occurrences and cluster concept weightings are mapped into a multi-dimensional concept space for each theme and iteratively generated until the clusters settle. The resultant data minima indicates those documents having the most pertinence to the identified concepts.

An embodiment of the present invention is a system and a method for analyzing unstructured documents for conceptual relationships. A frequency of occurrences of concepts in a set of unstructured documents is determined. Each concept represents an element occurring in one or more of the unstructured documents. A subset of concepts is selected out of the frequency of occurrences. One or more concepts from the concepts subset is grouped. Weights are assigned to one or more clusters of concepts for each group of concepts. A best fit approximation is calculated for each document indexed by each such group of concepts between the frequency of occurrences and the weighted cluster for each such concept grouped into the group of concepts.

A further embodiment is a system and method for dynamically evaluating latent concepts in unstructured documents. A multiplicity of concepts are extracted from a set of unstructured documents into a lexicon. The lexicon uniquely identifies each concept and a frequency of occurrence. Additionally, a frequency of occurrence representation is created for each documents set. The representation provides an ordered corpus of the frequencies of occurrence of each concept. A subset of concepts is selected from the frequency of occurrence representation filtered against a minimal set of concepts each referenced in at least two documents with no document in the corpus being unreferenced. A group of weighted clusters of concepts selected from the concepts subset is generated. A matrix of best fit approximations is determined for each document weighted against each group of weighted clusters of concepts.

In summary, the present invention semantically evaluates terms and phrases with the goal of creating meaningful themes. Document frequencies and co-occurrences of terms and phrases are used to select a minimal set of highly correlated terms and phrases that reference all documents in a corpus.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Glossary

Keyword: A literal search term which is either present or absent from a document. Keywords are not used in the evaluation of documents as described herein.

Term: A root stem of a single word appearing in the body of at least one document.

Phrase: Two or more words co-occurring in the body of a document.

A phrase can include stop words.

Concept: A collection of terms or phrases with common semantic meanings.

Theme: Two or more concepts with a common semantic meaning.

Cluster: All documents for a given concept or theme.

The foregoing terms are used throughout this document and, unless indicated otherwise, are assigned the meanings presented above.

Figure 1:
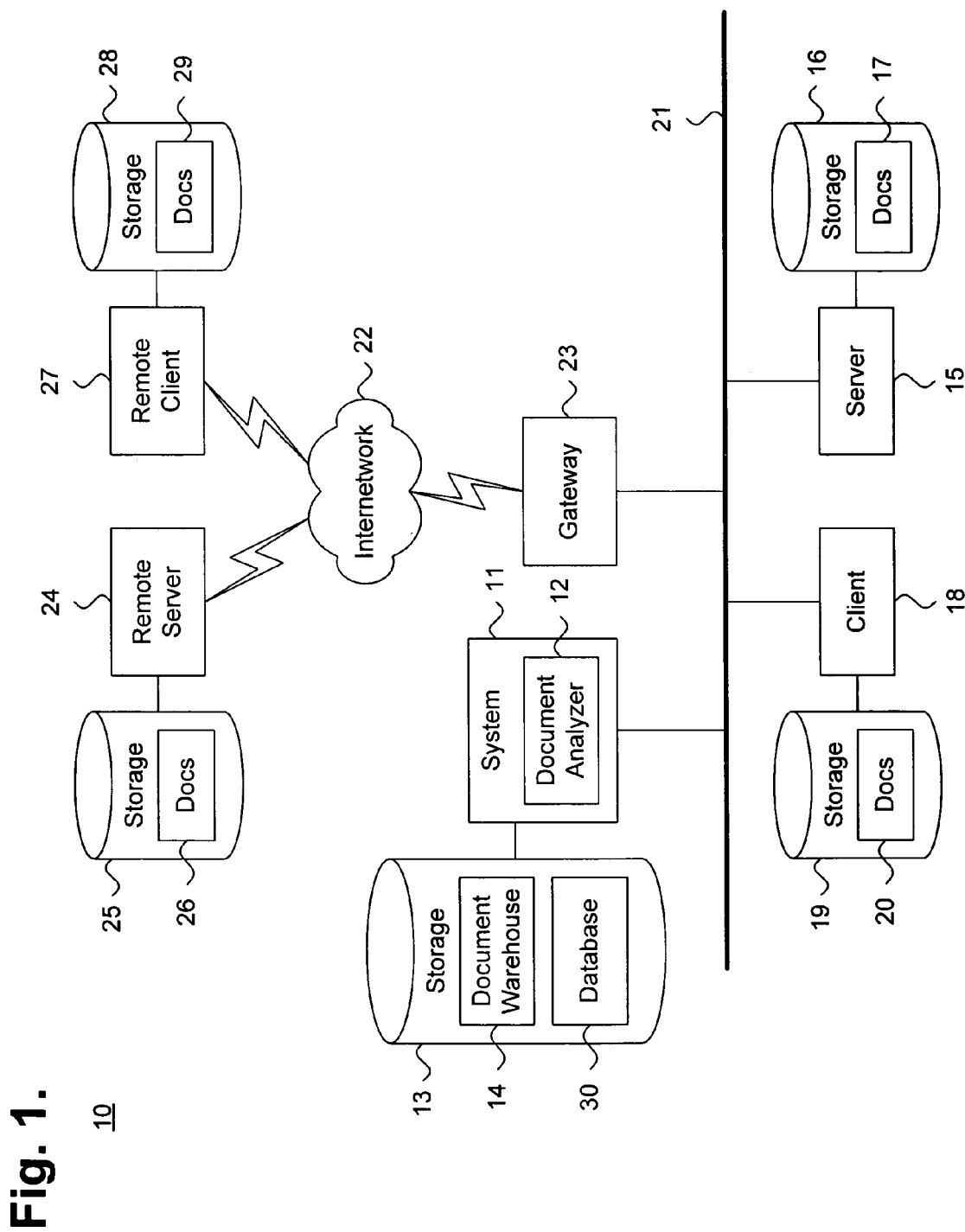
FIG. 1 is a block diagram showing a system for dynamically evaluating latent concepts in unstructured documents, in accordance with the present invention.

FIG. 1 is a block diagram showing a system 11 for dynamically evaluating latent concepts in unstructured documents, in accordance with the present invention. By way of illustration, the system 11 operates in a distributed computing environment 10 which includes a plurality of heterogeneous systems and document sources. The system 11 implements a document analyzer 12, as further described below beginning with reference to FIG. 2, for evaluating latent concepts in unstructured documents. The system 11 is coupled to a storage device 13 which stores a document warehouse 14 for maintaining a repository of documents and a database 30 for maintaining document information.

The document analyzer 12 analyzes documents retrieved from a plurality of local sources. The local sources include documents 17 maintained in a storage device 16 coupled to a local server 15 and documents 20 maintained in a storage device 19 coupled to a local client 18. The local server 15 and local client 18 are interconnected to the system 11 over an intranetwork 21. In addition, the document analyzer 12 can identify and retrieve documents from remote sources over an internetwork 22, including the Internet, through a gateway 23 interfaced to the intranetwork 21. The remote sources include documents 26 maintained in a storage device 25 coupled to a remote server 24 and documents 29 maintained in a storage device 28 coupled to a remote client 27.

The individual documents 17, 20, 26, 29 include all forms and types of unstructured data, including electronic message stores, such as electronic mail (email) folders, word processing documents or Hypertext documents, and could also include graphical or multimedia data. Notwithstanding, the documents could be in the form of structured data, such as stored in a spreadsheet or database. Content mined from these types of documents does not require preprocessing, as described below.

In the described embodiment, the individual documents 17, 20, 26, 29 include electronic message folders, such as maintained by the Outlook and Outlook Express products, licensed by Microsoft Corporation, Redmond, Wash. The database is an SQL-based relational database, such as the Oracle database management system, release 8, licensed by Oracle Corporation, Redwood Shores, Calif.

The individual computer systems, including system 11, server 15, client 18, remote server 24 and remote client 27, are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Figure 2:
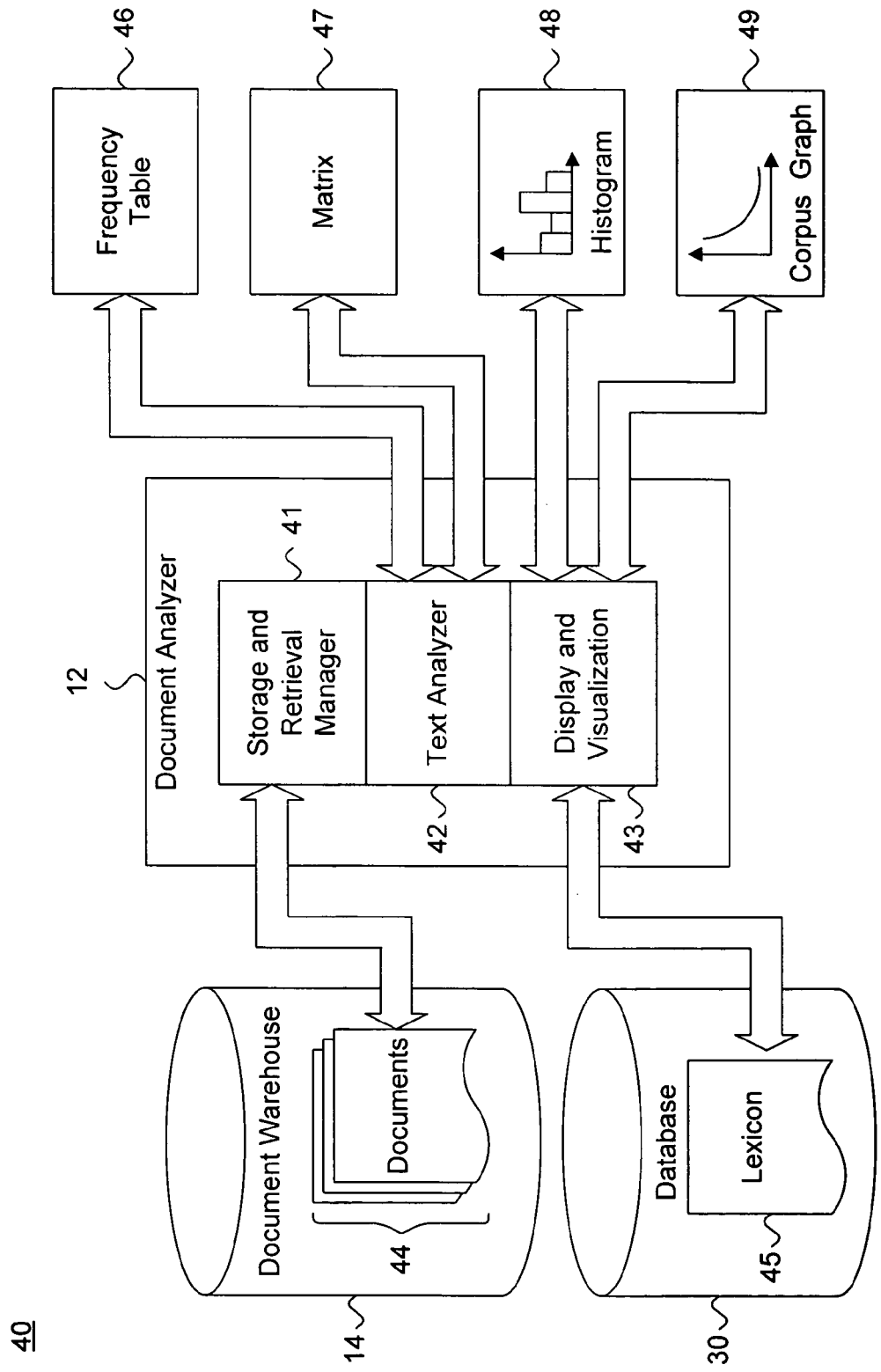
FIG. 2 is a block diagram showing the software modules implementing the document analyzer of FIG. 1.

FIG. 2 is a block diagram showing the software modules 40 implementing the document analyzer 12 of FIG. 1. The document analyzer 12 includes three modules: storage and retrieval manager 41, text analyzer 42, and display and visualization 43. The storage and retrieval manager 41 identifies and retrieves documents 44 into the document warehouse 14 (shown in FIG. 1). The documents 44 are retrieved from various sources, including both local and remote clients and server stores. The text analyzer 42 performs the bulk of the text mining processing. The display and visualization 43 complements the operations performed by the text analyzer 42 by presenting visual representations of the information extracted from the documents 44. The display and visualization 43 can also generate a graphical representation which preserves independent variable relationships, such as described in common-assigned U.S. Pat. No. 6,888,548, issued May 3, 2005, the disclosure of which is incorporated by reference.

During text analysis, the text analyzer 42 identifies terms and phrases and extracts concepts in the form of noun phrases that are stored in a lexicon 18 maintained in the database 30. After normalizing the extracted concepts, the text analyzer 42 generates a frequency table 46 of concept occurrences, as further described below with reference to FIG. 6, and a matrix 47 of summations of the products of pair-wise terms, as further described below with reference to FIG. 10. Similarly, the display and visualization 43 generates a histogram 47 of concept occurrences per document, as further described below with reference to FIG. 6, and a corpus graph 48 of concept occurrences over all documents, as further described below with reference to FIG. 8.

Each module is a computer program, procedure or module written as source code in a conventional programming language, such as the C++ programming language, and is presented for execution by the CPU as object or byte code, as is known in the art. The various implementations of the source code and object and byte codes can be held on a computer-readable storage medium. For example, the computer-readable storage medium can include a floppy disk, hard drive, digital video disk (DVD), random access memory (RAM), read-only memory (ROM), and similar storage mediums. The document analyzer 12 operates in accordance with a sequence of process steps, as further described below with reference to FIG. 5.

Figure 3:
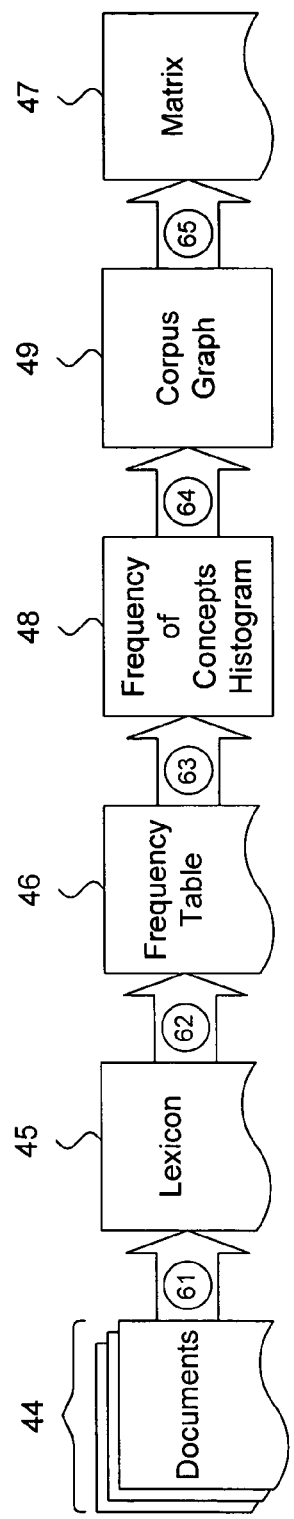
FIG. 3 is a process flow diagram showing the stages of text analysis performed by the document analyzer of FIG. 1.

FIG. 3 is a process flow diagram showing the stages 60 of text analysis performed by the document analyzer 12 of FIG. 1. The individual documents 44 are preprocessed and noun phrases are extracted as concepts (transition 61) into a lexicon 45. The noun phrases are normalized and queried (transition 62) to generate a frequency table 46. The frequency table 46 identifies individual concepts and their respective frequency of occurrence within each document 44. The frequencies of concept occurrences are visualized (transition 63) into a frequency of concepts histogram 48. The histogram 48 graphically displays the frequencies of occurrence of each concept on a per-document basis. Next, the frequencies of concept occurrences for all the documents 44 are assimilated (transition 64) into a corpus graph 49 that displays the overall counts of documents containing each of the extracted concepts. Finally, the most relevant concepts are summarized (transition 65) into a matrix 46 that presents the results as summations of the products of pair-wise terms.

Figure 4:
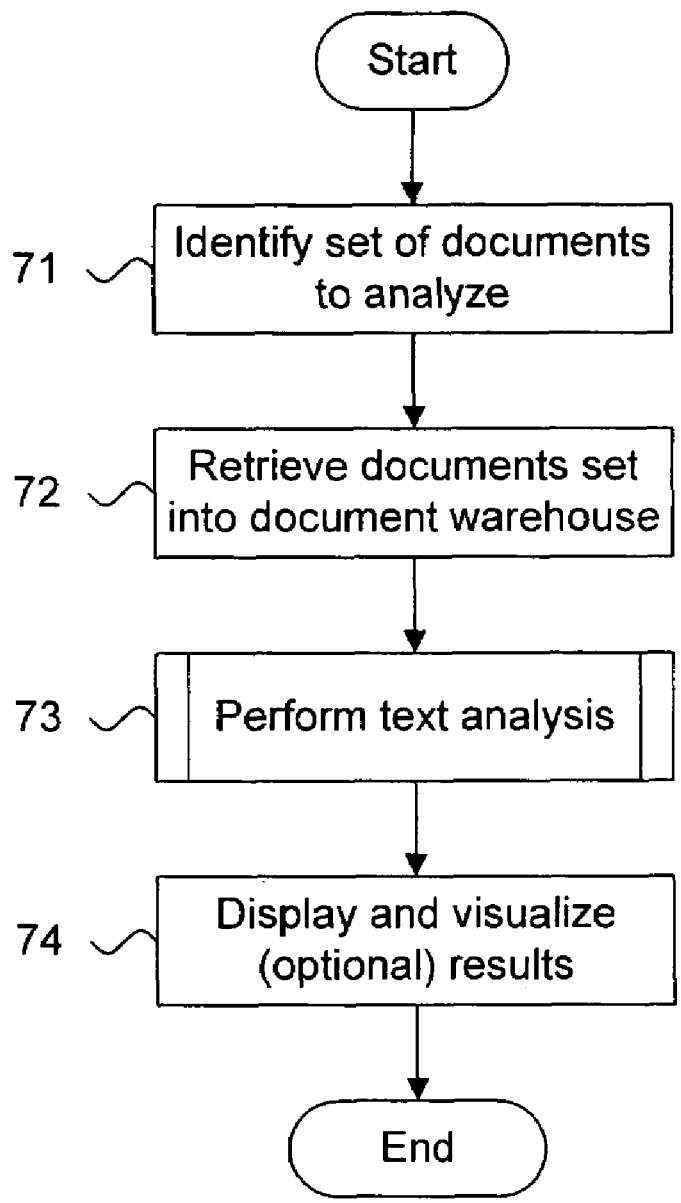
FIG. 4 is a flow diagram showing a method for dynamically evaluating latent concepts in unstructured documents, in accordance with the present invention.

FIG. 4 is a flow diagram showing a method 70 for dynamically evaluating latent concepts in unstructured documents 44 (shown in FIG. 2), in accordance with the present invention. As a preliminary step, the set of documents 44 to be analyzed is identified (block 71) and retrieved into the document warehouse 14 (shown in FIG. 1) (block 72). The documents 44 are unstructured data and lack a common format or shared type. The documents 44 include electronic messages stored in messaging folders, word processing documents, hypertext documents, and the like.

Once identified and retrieved, the set of documents 44 is analyzed (block 73), as further described below with reference to FIG. 5. During text analysis, a matrix 47 (shown in FIG. 2) of term-document association data is constructed to summarize the semantic content inherent in the structure of the documents 44. As well, the frequency of individual terms or phrases extracted from the documents 44 are displayed and the results are optionally visualized (block 74). The routine then terminates.

Figure 5:
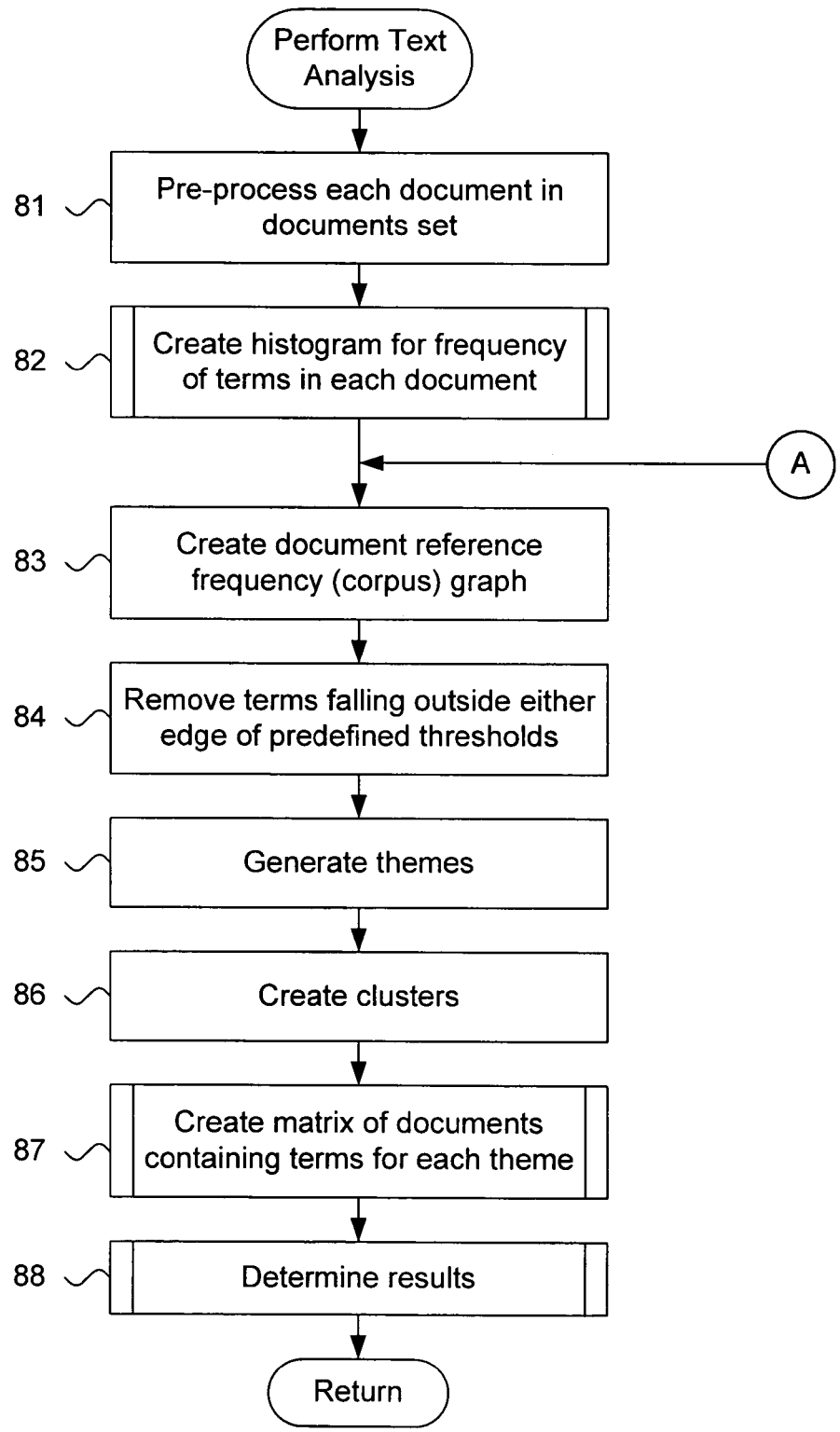
FIG. 5 is a flow diagram showing the routine for performing text analysis for use in the method of FIG. 4.

FIG. 5 is a flow diagram showing the routine 80 for performing text analysis for use in the method 70 of FIG. 4. The purpose of this routine is to extract and index terms or phrases for the set of documents 44 (shown in FIG. 2). Preliminarily, each document in the documents set 44 is preprocessed (block 81) to remove stop words. These include commonly occurring words, such as indefinite articles ("a" and "an"), definite articles ("the"), pronouns ("I", "he" and "she"), connectors ("and" and "or"), and similar non-substantive words.

Following preprocessing, a histogram 48 of the frequency of terms (shown in FIG. 2) is logically created for each document 44 (block 82), as further described below with reference to FIG. 6. Each histogram 48, as further described below with reference to FIG. 9, maps the relative frequency of occurrence of each extracted term on a per-document basis.

Figures 9, 10:
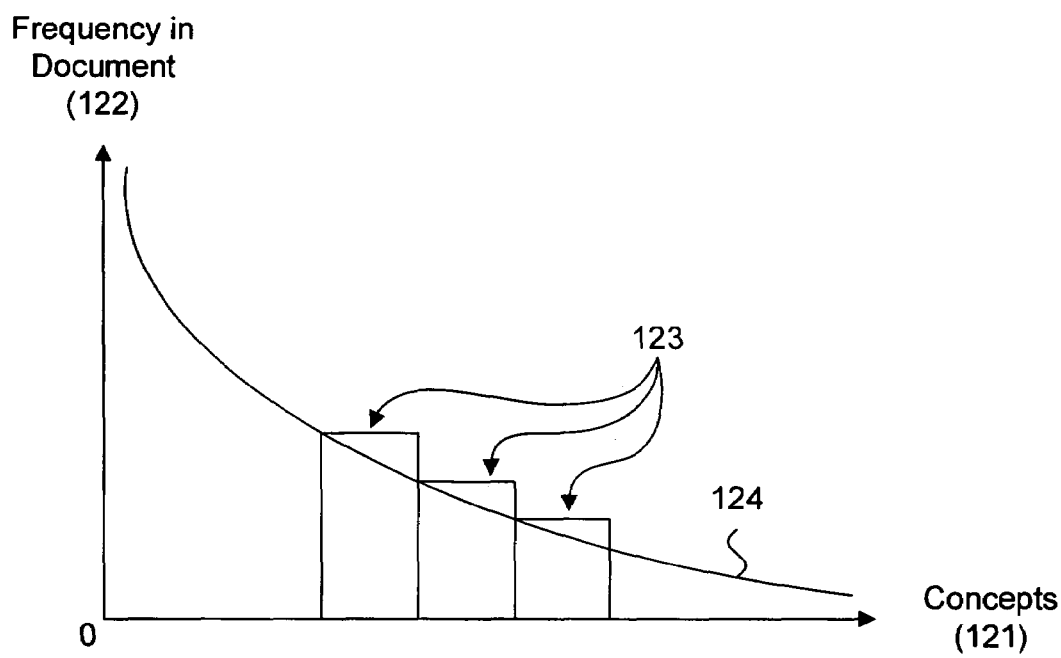
FIG. 9 is a graph showing, by way of example, a histogram of the frequencies of concept occurrences generated by the routine of FIG. 6.
FIG. 10 is a table showing, by way of example, concept occurrence frequencies generated by the routine of FIG. 6.

Next, a document reference frequency (corpus) graph 49, as further described below with reference to FIG. 10, is created for all documents 44 (block 83). The corpus graph 49 graphically maps the semantically-related concepts for the entire documents set 44 based on terms and phrases. A subset of the corpus is selected by removing those terms and phrases falling outside either edge of predefined thresholds (block 84). For shorter documents, such as email, having less semantically-rich content, the thresholds are set from about 1% to about 15%, inclusive. Larger documents may require tighter threshold values.

The selected set of terms and phrases falling within the thresholds are used to generate themes (and concepts) (block 85) based on correlations between normalized terms and phrases in the documents set. In the described embodiment, themes are primarily used, rather than individual concepts, as a single co-occurrence of terms or phrases carries less semantic meaning than multiple co-occurrences. As used herein, any reference to a "theme" or "concept" will be understood to include the other term, except as specifically indicated otherwise.

Next, clusters are created (block 86) from groups of highly-correlated concepts and themes. Individual concepts and themes are categorized based on, for example, Euclidean distances calculated between each pair of concepts and themes and defined within a pre-specified range of variance, such as described in common-assigned U.S. Pat. No. 6,778,995, issued Aug. 17, 2004, the disclosure of which is incorporated by reference.

A matrix 47 of the documents 44 is created (block 87), as further described below with reference to FIG. 13. The matrix 47 contains the inner products of document concept frequency occurrences and cluster concept weightings mapped into a multi-dimensional concept space for each theme. Finally, the results of the text analysis operations are determined (block 88), as further described below with reference to FIG. 14, after which the routine returns.

Figure 6:
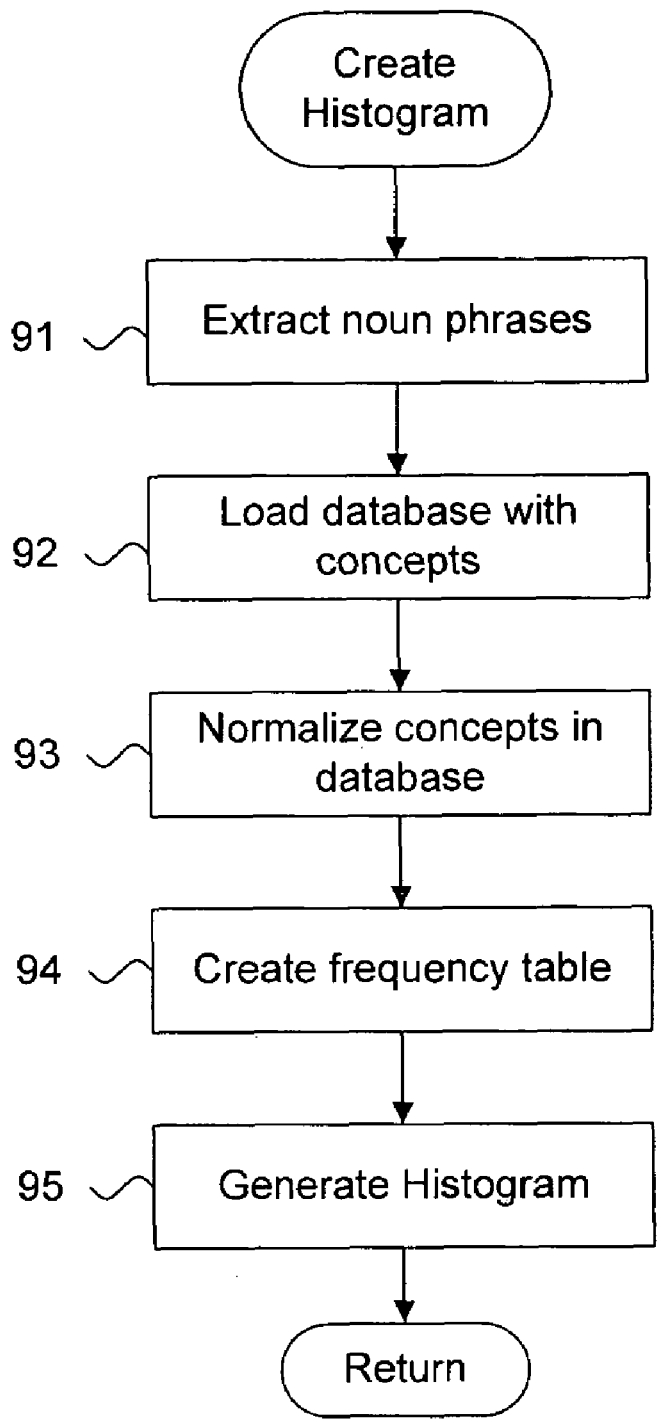
FIG. 6 is a flow diagram showing the routine for creating a histogram for use in the routine of FIG. 5.

FIG. 6 is a flow diagram showing the routine 90 for creating a histogram 48 (shown in FIG. 2) for use in the routine of FIG. 5. The purpose of this routine is to extract noun phrases representing individual concepts and to create a normalized representation of the occurrences of the concepts on a per-document basis. The histogram represents the logical union of the terms and phrases extracted from each document. In the described embodiment, the histogram 48 need not be expressly visualized, but is generated internally as part of the text analysis process.

Initially, noun phrases are extracted (block 91) from each document 44. In the described embodiment, concepts are defined on the basis of the extracted noun phrases, although individual nouns or tri-grams (word triples) could be used in lieu of noun phrases. In the described embodiment, the noun phrases are extracted using the LinguistX product licensed by Inxight Software, Inc., Santa Clara, Calif.

Once extracted, the individual terms or phrases are loaded into records stored in the database 30 (shown in FIG. 1) (block 92). The terms stored in the database 30 are normalized (block 93) such that each concept appears as a record only once. In the described embodiment, the records are normalized into third normal form, although other normalization schemas could be used.

Figure 7:
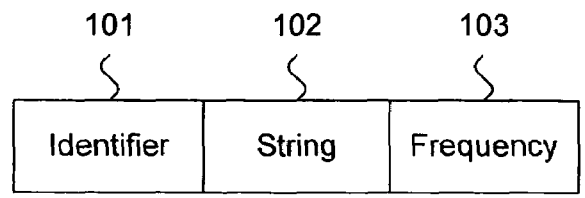
FIG. 7 is a data structure diagram showing a database record for a concept stored in the database 30 of FIG. 1.

FIG. 7 is a data structure diagram showing a database record 100 for a concept stored in the database 30 of FIG. 1. Each database record 100 includes fields for storing an identifier 101, string 102 and frequency 103. The identifier 101 is a monotonically increasing integer value that uniquely identifies each term or phrase stored as the string 102 in each record 100. The frequency of occurrence of each term or phrase is tallied in the frequency 103.

Figure 8:
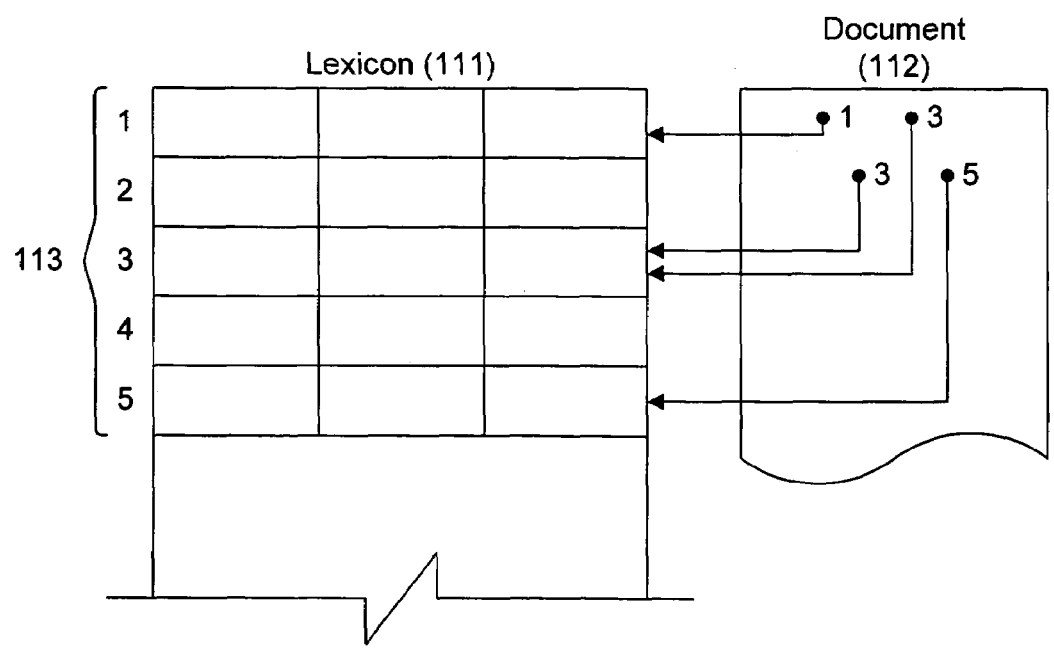
FIG. 8 is a data structure diagram showing, by way of example, a database table containing a lexicon of extracted concepts stored in the database 30 of FIG. 1.

FIG. 8 is a data structure diagram showing, by way of example, a database table 110 containing a lexicon 111 of extracted concepts stored in the database 30 of FIG. 1. The lexicon 111 maps out the individual occurrences of identified terms 113 extracted for any given document 112. By way of example, the document 112 includes three terms numbered 1, 3 and 5. Concept 1 occurs once in document 112, concept 3 occurs twice, and concept 5 occurs once. The lexicon tallies and represents the occurrences of frequency of the concepts 1, 3 and 5 across all documents 44.

Referring back to FIG. 6, a frequency table is created from the lexicon 111 for each given document 44 (block 94). The frequency table is sorted in order of decreasing frequencies of occurrence for each concept 113 found in a given document 44. In the described embodiment, all terms and phrases occurring just once in a given document are removed as not relevant to semantic content. The frequency table is then used to generate a histogram 48 (shown in FIG. 2) (block 95) which visualizes the frequencies of occurrence of extracted concepts in each document. The routine then returns.

FIG. 9 is a graph showing, by way of example, a histogram 48 of the frequencies of concept occurrences generated by the routine of FIG. 6. The x-axis defines the individual concepts 121 for each document and the y-axis defines the frequencies of occurrence of each concept 122. The concepts are mapped in order of decreasing frequency 123 to generate a curve 124 representing the semantic content of the document 44. Accordingly, terms or phrases appearing on the increasing end of the curve 124 have a high frequency of occurrence while concepts appearing on the descending end of the curve 124 have a low frequency of occurrence.

FIG. 10 is a table 130 showing, by way of example, concept occurrence frequencies generated by the routine of FIG. 6. Each concept 131 is mapped against the total frequency occurrence 132 for the entire set of documents 44. Thus, for each of the concepts 133, a cumulative frequency 134 is tallied. The corpus table 130 is used to generate the document concept frequency reference (corpus) graph 49.

Figures 11, 13:
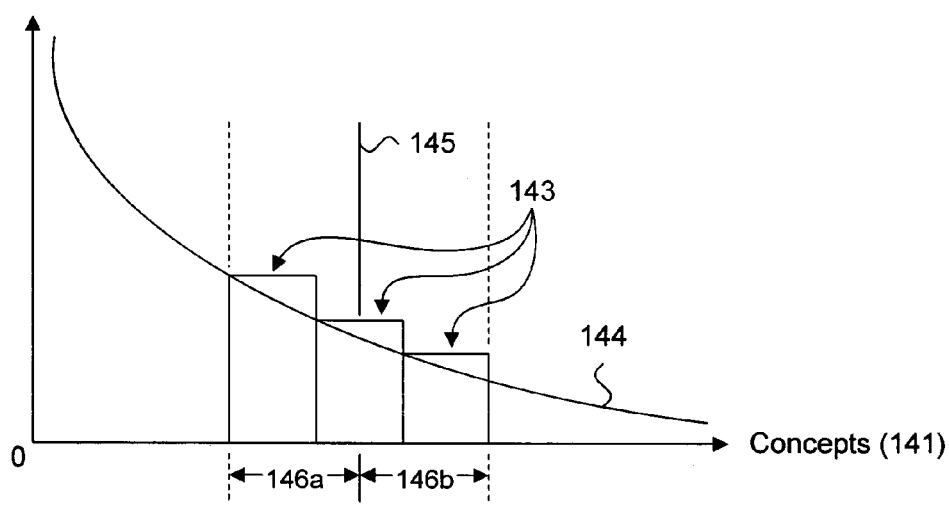
FIG. 11 is a graph showing, by way of example, a corpus graph of the frequency of concept occurrences generated by the routine of FIG. 5.
FIG. 13 is a table showing, by way of example, the matrix of themes generated by the routine of FIG. 12.

FIG. 11 is a graph 140 showing, by way of example, a corpus graph of the frequency of concept occurrences generated by the routine of FIG. 5. The graph 140 visualizes the extracted concepts as tallied in the corpus table 130 (shown in FIG. 10). The x-axis defines the individual concepts 141 for all documents and the y-axis defines the number of documents 44 referencing each concept 142. The individual concepts are mapped in order of descending frequency of occurrence 143 to generate a curve 144 representing the latent semantics of the set of documents 44.

A median value 145 is selected and edge conditions 146*a-b* are established to discriminate between concepts which occur too frequently versus concepts which occur too infrequently. Those documents falling within the edge conditions 146*a-b* form a subset of documents containing latent concepts. In the described embodiment, the median value 145 is document-type dependent. For efficiency, the upper edge condition 146*b* is set to 70% and the 64 concepts immediately preceding the upper edge condition 146*b* are selected, although other forms of threshold discrimination could also be used.

Figure 12:
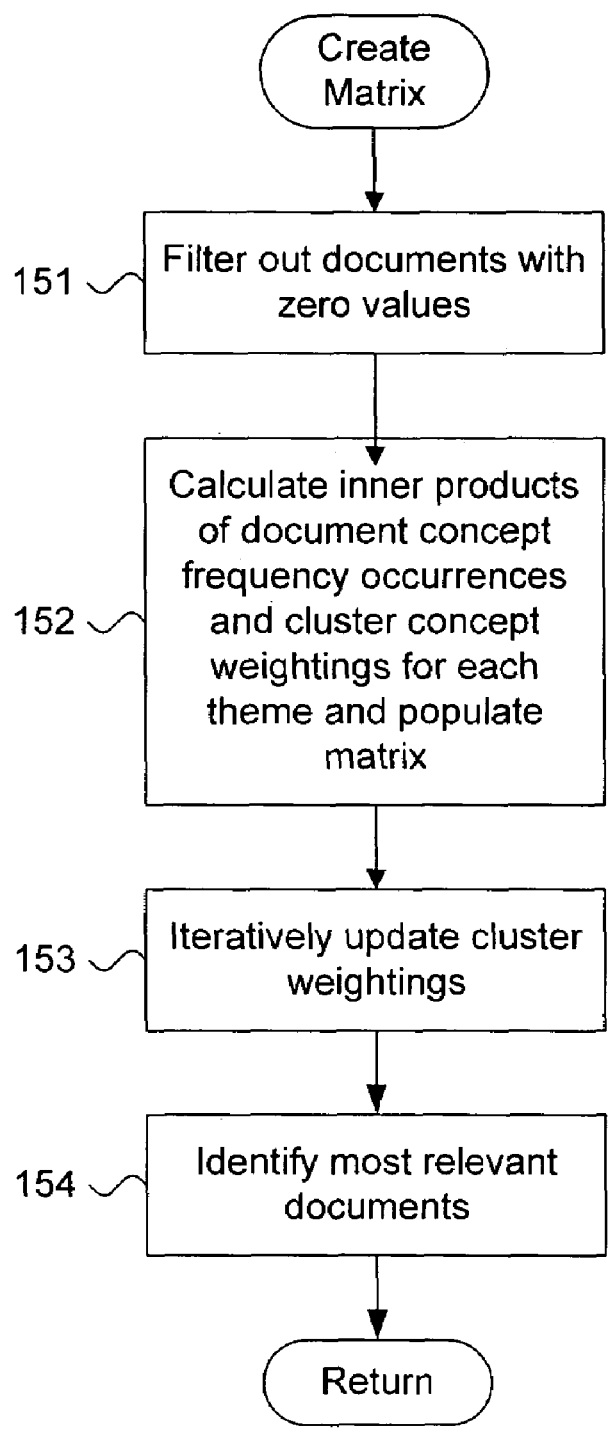
FIG. 12 is a flow diagram showing a routine for creating a matrix for use in the routine of FIG. 5.

FIG. 12 is a flow diagram showing the routine 150 for creating a matrix 47 (shown in FIG. 2) for use in the routine of FIG. 5. Initially, those documents 44 having zero values for frequency counts are removed through filtering (block 151). The inner products of document concept frequency occurrences and cluster concept weightings mapped into a multi-dimensional concept space for each theme are calculated and used to populate the matrix (block 152). The individual cluster weightings are iteratively updated (block 153) to determine best fit. Those documents having the smallest inner products are deemed most relevant to a given theme and are identified (block 154). The routine then returns.

FIG. 13 is a table 170 showing the matrix 47 generated by the routine of FIG. 12. The matrix 47 maps a cluster 171 to documents 172 based on a calculated inner product. Each inner product quantifies similarities between documents, as represented by a distance. The distance is mapped into a multi-dimensional concept space for a given document, as measured by the magnitude of a vector for a given term drawn relative to an angle θ, held constant for the given cluster.

For a set of n documents, the distance $d_{cluster}$ is calculated by taking the sum of products (inner product) by terms between document concept frequency occurrences and cluster concept weightings, using the following equation:

$$d_{cluster} = \sum_{i \to n} doc_{term_i} \cdot cluster_{term_i}$$

where $doc_{term}$ represents the frequency of occurrence for a given term i in the selected document and $cluster_{term}$ represents the weight of a given cluster for a given term i. The weights of the individual inner products are iteratively updated until the clusters settle. The goal is to calculate the minimum distances between as few clusters as possible until the rate of change goes constant. The rate of change can be calculated, for example, by taking the first derivative of the inner products over successive iterations.

Figure 14:
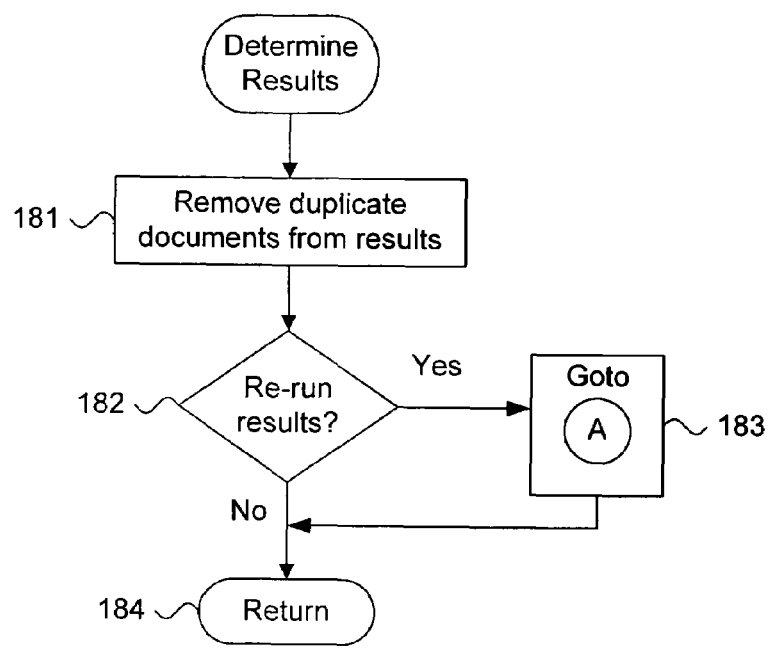
FIG. 14 is a flow diagram showing a routine for determining results for use in the routine of FIG. 5.

FIG. 14 is a flow diagram showing the routine 180 for determining results for use in the routine of FIG. 5. Duplicate documents 44 are removed from the results (block 181). The results are re-run (block 182), as necessary by repeating the text analysis operations (block 183), beginning with creating the corpus graph 49 (block 84 in FIG. 5). After satisfactory results have been obtained (block 182), the routine returns.

Satisfactory results are shown when a meaningful cluster of documents is found. Objectively, each document within a given theme will have an inner product falling within a pre-defined variance of other related documents, thereby reflecting a set amount of similarity. The cluster itself represents a larger grouping of document sets based on related, but not identical, themes.

If necessary, the results are re-run (block 182). One reason to re-run the results set would be to re-center the median value 145 of the corpus graph 140 (shown in FIG. 11) following the filtering of further documents 44. The filtering of edge condition concept frequency occurrences will cause the curve 144 to be redefined, thereby requiring further processing.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-readable storage medium storing computer executable program code to be executed by a computer system, the computer executable program code comprising the method of:
   storing data on a computer-readable storage medium, comprising:
      tabulating frequencies of occurrence of terms from within a set of documents;
      correlating and selecting two or more of the terms to generate weighted groups of themes based on at least one of upper and lower edge conditions on the frequencies of occurrence;
      determining an inner product for each theme as a function of the frequencies of occurrence and the weighted groups of themes; and
      assigning each document into a set of clusters based on the inner product of the theme comprising those terms from the document; and
   accessing code for the data stored on the computer-readable storage medium.

2. The storage medium according to claim 1, wherein the semantic relatedness of those terms collectively comprised within a theme is bounded.

3. The storage medium according to claim 1, further comprising:
   multidimensional data that models each term, wherein each term corresponds to a different dimension within a logically-defined concept space.

4. The storage medium according to claim 1, wherein the upper and lower limits are set in a range substantially comprising from one percent to fifteen percent where the documents comprise email.

5. A system for identifying clustered groups of semantically-related documents, comprising:
   a memory, comprising:
      frequencies of occurrence of terms tabulated from within a set of documents; and
      weighted groups of themes that include two or more of the terms, which are correlated and selected to generate the themes based on at least one of upper and lower edge conditions on the frequencies of occurrence; and
   a processor, comprising:
      a text analyzer to determine an inner product for each theme as a function of the frequencies of occurrence and the weighted groups of themes; and
      a visualization module to assign each document into a cluster based on the inner product of the theme comprising those terms from the document.

6. The system according to claim 5, wherein the semantic relatedness of each theme is iteratively redetermined, and each document is reassigned into the cluster based on the theme comprising those terms from the document that reflect a most-recently determined strongest semantic relatedness.

7. The system according to claim 5, wherein, for the set of n documents, the semantic relatedness $s_r$ is determined as an inner product of the frequencies of occurrence and group weights, using the following equation:

$$s_r = \sum_{i \to n} d_{t_i} \cdot g_{t_i}$$

where $d_t$ represents the frequencies of occurrence for the $i^{th}$ term t in the document and $g_t$ represents the weight of the group for the $i^{th}$ term.

8. The system according to claim 5, wherein the semantic relatedness of those terms collectively comprised within a theme is bounded.

9. The system according to claim 5, further comprising:
   a two-dimensional visualization of the themes to render each cluster for output by semantic relatedness.

10. The system according to claim 5, further comprising:
   multidimensional data to model each term, wherein each term corresponds to a different dimension within a logically-defined concept space.

11. The system according to claim 5, wherein the upper and lower limits are set in a range substantially comprising from one percent to fifteen percent where the documents comprise email.

12. A computer-readable storage medium storing computer executable program code to be executed by a computer system, the computer executable program code comprising the method of:
    collectively organizing structured data as a database record, comprising:
        tabulating frequencies of occurrence of terms from within a set of documents;
        correlating and selecting two or more of the terms to generate weighted groups of themes based on at least one of upper and lower edge conditions on the frequencies of occurrence;
        determining an inner product for each theme as a function of the frequencies of occurrence and the weighted groups of themes; and
        assigning each document into a cluster based on the inner product of the theme comprising those terms from the document; and
        accessing code for the structured data of the database record on the computer-readable storage medium.

13. The storage medium according to claim 12, wherein the semantic relatedness of each theme is iteratively redetermined, and each document is reassigned into the cluster based on the theme comprising those terms from the document that reflect a most-recently determined strongest semantic relatedness.

14. The storage medium according to claim 12, wherein each cluster is rendered for output within a two-dimensional visualization of the themes by semantic relatedness.

15. The storage medium according to claim 12, wherein the upper and lower limits are set in a range substantially comprising from one percent to fifteen percent where the documents comprise email.

16. A method for identifying clustered groups of semantically-related documents, comprising:
    tabulating frequencies of occurrence of terms within a set of documents;
    correlating weighted groups of themes including two or more of the terms;
    selecting the terms to generate the themes based on at least one of upper and lower edge conditions on the frequencies of occurrence;
    determining an inner product for each theme as a function of the frequencies of occurrence and the weighted groups of themes; and
    assigning each document into a cluster based on the inner product of the theme comprising those terms from the document.

17. The method according to claim 16, further comprising:
    iteratively redetermining the semantic relatedness of each theme; and
    reassigning each document into the cluster based on the theme comprising those terms from the document that reflect a most-recently determined strongest semantic relatedness.

18. The method according to claim 16, wherein, for the set of n documents, the semantic relatedness $s_r$ is determined as an inner product of the frequencies of occurrence and group weights, using the following equation:

$$s_r = \sum_{i \to n} d_{t_i} \cdot g_{t_i}$$

where $d_t$ represents the frequencies of occurrence for the $i^{th}$ term t in the document and $g_t$ represents the weight of the group for the $i^{th}$ term t.

19. The method according to claim 16, further comprising:
    bounding the semantic relatedness of those terms collectively comprised within a theme.

20. The method according to claim 16, further comprising:
    rendering each cluster for output within a two-dimensional visualization of the themes by semantic relatedness.

21. The method according to claim 16, further comprising:
    modeling each term as multidimensional data, wherein each term corresponds to a different dimension within a logically-defined concept space.

22. The method according to claim 16, wherein the upper and lower limits are set in a range substantially comprising from one percent to fifteen percent where the documents comprise email.

23. A system for identifying clustered groups of semantically-related documents, comprising:
    a set of stored documents that each comprise at least one term, wherein each term corresponds to a different dimension within a logically-defined multi-dimensional concept space;
    a database comprising a memory to store records that each comprises:
        frequencies of occurrence of terms tabulated from within a set of documents; and
        weighted groups of themes that include two or more of the terms, which are correlated and selected to generate the themes based on at least one of upper and lower edge conditions on the frequencies of occurrence;
    a processor, comprising:
        a text analyzer to determine an inner product for each theme as a function of the frequencies of occurrence and the weighted groups of themes; and
        a visualization module to assign each document into a cluster based on the inner product of the theme comprising those terms from the document; and
    a display system to render each cluster for output as a two-dimensional visualization of the themes by semantic relatedness.

24. The system according to claim 23, wherein the semantic relatedness of each theme is iteratively redetermined, and each document is reassigned into the cluster based on the theme comprising those terms from the document that reflect a most-recently determined strongest semantic relatedness.

25. The system according to claim 23, wherein the semantic relatedness of those terms collectively comprised within a theme is bounded.

26. The system according to claim 23, wherein the upper and lower limits are set in a range substantially comprising from one percent to fifteen percent where the documents comprise email.

* * * * *